UNITED STATES PATENT OFFICE.

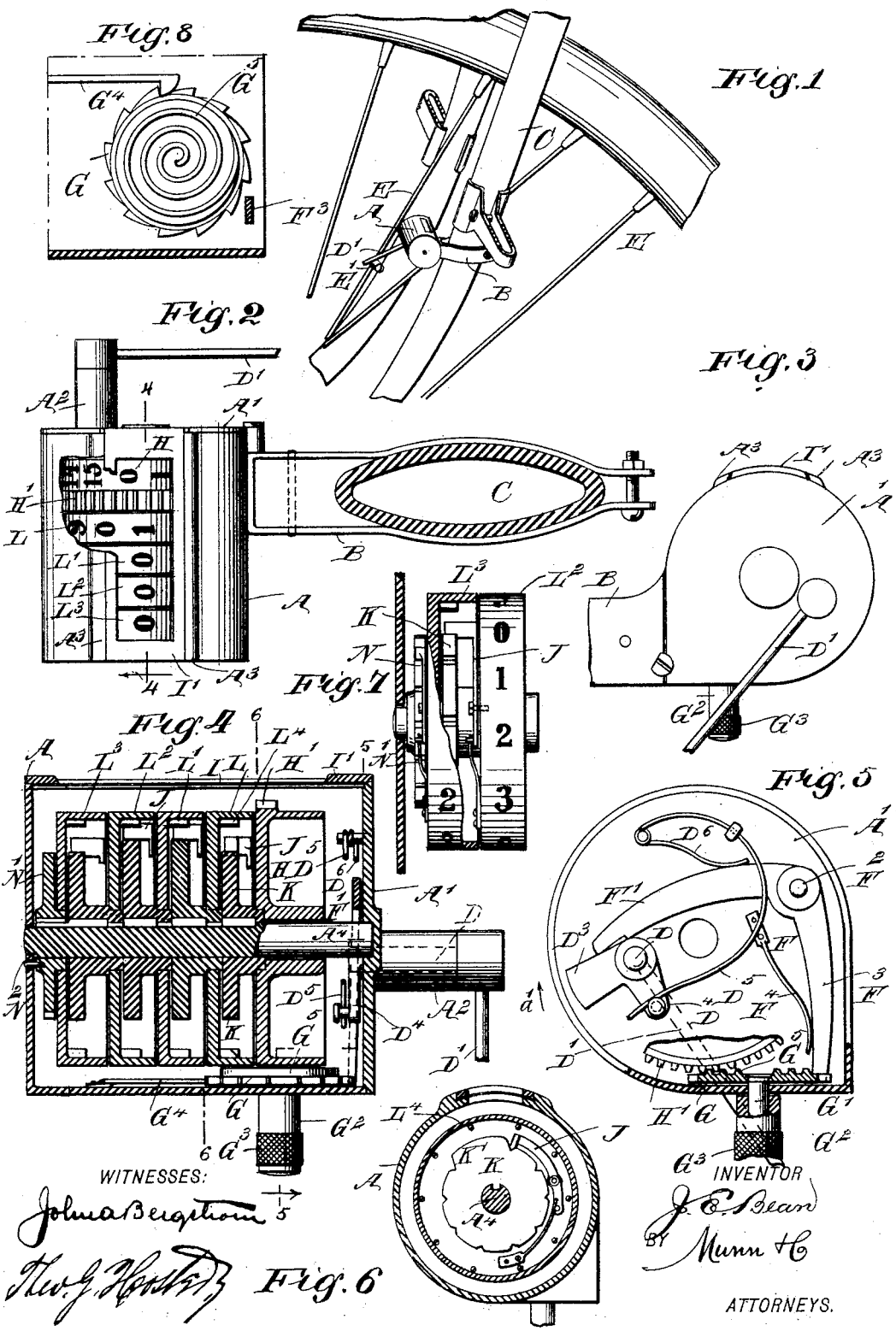

JAMES E. BEAN, OF IRONWOOD, MICHIGAN.

CYCLOMETER.

SPECIFICATION forming part of Letters Patent No. 534,133, dated February 12, 1895.

Application filed May 25, 1894. Serial No. 512,405. (No model.)

*To all whom it may concern:*

Be it known that I, JAMES E. BEAN, of Ironwood, in the county of Gogebic and State of Michigan, have invented a new and Improved Cyclometer, of which the following is a full, clear, and exact description.

The invention relates to cyclometers for bicycles and other vehicles, and its object is to provide a new and improved cyclometer, which is comparatively simple and durable in construction, not liable to get out of order, and arranged to accurately indicate the distance traversed by the vehicle.

The invention consists in certain parts and details, and combinations of the same, as will be hereinafter fully described and then pointed out in the claims.

Reference is to be had to the accompanying drawings, forming a part of this specification, in which similar letters of reference indicate corresponding parts in all the views.

Figure 1 is a perspective view of the improvement as applied. Fig. 2 is an enlarged sectional plan view of the same. Fig. 3 is a rear end elevation of the improvement. Fig. 4 is an enlarged transverse section of the same, on the line 4—4 of Fig. 2. Fig. 5 is a sectional elevation of the same, on the line 5—5 of Fig. 4. Fig. 6 is a reduced sectional elevation of the same, on the line 6—6 of Fig. 4. Fig. 7 is a side elevation of part of the improvement, parts being in section; and Fig. 8 is a sectional plan view of the combination ratchet wheel and worm.

The improved cyclometer is provided with a casing A, preferably made cylindrical in form, and supported on a clamp B, adapted to be clamped to one of the arms of the fork C of the bicycle, as plainly illustrated in Fig. 1. The clamping device B is preferably located directly below the foot-rest for coasting, and the inner end of the casing is arranged in close proximity to the wheel passing between the arms of the fork C.

The cylindrical casing A is provided at its inner end with a removable cap $A'$, in which is journaled in suitable bearings $A^2$, a transversely extending short shaft D, provided on its outer end with an arm $D'$ adapted to be engaged by a projection $E'$, held on one of the spokes $E^2$ of the wheel E passing between the arms of the fork C. The projection $E'$ is preferably covered with leather, rubber, or other suitable material, so that when the wheel E is rotated then the projection easily strikes the arm $D'$, and turns the same in one direction, to finally release the arm to permit of the return movement of the latter, as hereinafter more fully described.

On the inner end of the shaft D is secured an arm $D^3$, see Fig. 5, having an extension $D^4$ pressed on by the free end of a spring $D^5$ secured on the inner face of the cap $A'$. The arm $D^3$ is adapted to act on the arm $F'$ of a bell crank lever pawl F, fulcrumed at $F^2$ on the inner face of the cap $A'$, as plainly shown in Fig. 5. The pawl $F^3$ of this bell crank lever pawl F, is adapted to engage and turn a ratchet wheel G, provided with a shaft $G'$ mounted to turn in suitable bearings in the casing A, the outer end of the said shaft $G'$ being provided with a knob $G^2$ having a knurled head $G^3$, to permit the operator to conveniently turn the said shaft $G'$ and the ratchet wheel G, for setting the wheel whenever desired. A spring $F^4$ presses on the lever pawl $F^3$, so as to hold the latter normally out of contact with the ratchet wheel G, the other arm $F'$ of the said lever pawl F being also pressed on by an extension $D^6$ of the spring $D^5$. Now, it will be seen that when a swinging motion is given to the arm $D'$ by the projection $E'$ held on the spoke $E^2$ of the wheel E, as previously mentioned, then the arm $D^3$ swings in the direction of the arrow $a'$, thus imparting a like swinging motion to the arm $F'$ of the bell crank lever pawl F, so that the pawl $F^3$ engages the ratchet wheel G and turns the same. As soon as the projection $E'$ passes the end of the arm $D'$, then the latter returns to its normal position, owing to the action of the spring $D^5$ on the arm $D^3$ secured on the shaft D carrying the arm $D'$. A dog $G^4$, engaging the ratchet wheel G, prevents a return movement of the latter, as will be readily understood by reference to Fig. 4.

On the face of the ratchet wheel G is formed a worm $G^5$, in mesh with a worm wheel $H'$ secured to or formed on the numeral wheel H, mounted to rotate loosely on a transversely-extending shaft $A^4$ journaled in suitable bearings in the heads of the casing A. See Fig. 4. On the periphery of this numeral wheel H are formed or secured numerals from 1 to 15 inclusive, each indicating one-sixteenth of a mile, so that when the said wheel has made one complete revolution, one mile has been traversed by the vehicle on which the cyclometer is applied. The numerals on the periphery of the wheel H are visible to the rider of the vehicle through a transparent or translucent strip I, secured in a bezel I', fitted to slide transversely in suitable bearings A³ held on the peripheral surface of the casing A, as plainly shown in Figs. 2 and 3.

On the rear face of the web of the numeral wheel H is secured a spring-pressed pawl J, engaging a notched wheel K secured on the shaft A⁴, as plainly shown in Fig. 6, the said notched wheel K being provided between two of its notches with an offset K', to cause the free end of the pawl J to rise to move in contact with a projection or tooth L⁴ secured on the unit numeral wheel L, arranged alongside the numeral wheel H, and formed or provided on its periphery with numerals from zero (0) to 9. See Fig. 2. A second or a tenth numeral wheel L' is arranged alongside this unit wheel L. A hundredth wheel L² follows the wheel L', and likewise a thousandth wheel L³ follows the wheel L². It is expressly understood that each wheel is actuated from a spring-pressed pawl J, engaging a notched disk K having an offset K', the said notched disks being all secured on the shaft A⁴, as indicated in Fig. 4. The last numeral wheel L³ is provided on the outer face of its web with a spring-pressed pawl N, engaging a fixed wheel N' held on the shaft A⁴, but fastened by a screw N², or other means, to the front of the casing A, as illustrated in Fig. 4. The several disks K are all notched so as to prevent the numeral wheels from accidentally turning by the jarring of the vehicle. Now it will be seen that by the arrangement described, the wheel H when making a complete revolution, causes its pawl J to travel up the projection K', to engage the tooth L⁴ of the wheel L, so as to turn the latter to the next numeral, this numeral appearing through the strip T, to the rider or other observer. When the wheel H has made ten revolutions it has given ten impulses to the wheel L, so that the latter has made a complete revolution, and in doing so its spring-pressed pawl J acts on the tooth L⁴ of the tenth numeral wheel L', to shift the latter to the next numeral. A similar movement takes place between the remaining numeral wheels whenever the preceding wheel has made a complete revolution, and by its pawl has shifted the following numeral wheel to the next number.

It will be seen that by the device described, the bell crank lever pawl F is out of engagement with the ratchet wheel G as long as the arm D' is not acted on by the projection E' of the wheel E; and the several numeral wheels are constructed in such a manner as to readily operate one after the other in the manner described, to properly and accurately indicate the number of miles traversed, with the fractions of miles indicated by the numeral wheel H.

It will also be seen that the device is very simple and durable in construction and can be readily attached to the frame of a bicycle or other vehicle, and the numeral wheels can be readily shifted to zero, when starting, by sliding the bezel I' to one side to get convenient access to the casing A, for turning the numeral wheels by hand to zero.

It will further be seen that by unlocking the cap A', the latter can be readily removed, and the shaft A⁴ with the several numeral wheels, notched wheels and pawls, removed from the casing.

Having thus described my invention, I claim as new and desire to secure by Letters Patent—

1. A cyclometer, comprising a shaft carrying on its outer end an arm adapted to be actuated from one of the active parts of a vehicle, a spring-pressed arm on the inner end of the said shaft, a bell crank lever pawl adapted to be actuated by the said spring-pressed arm, and a ratchet wheel adapted to be engaged by the said pawl and formed on its base with a worm for actuating a numeral wheel, substantially as shown and described.

2. A cyclometer, comprising a shaft carrying on its outer end an arm adapted to be actuated from one of the active parts of a vehicle, a spring-pressed arm on the inner end of the said shaft, a bell crank lever pawl adapted to be actuated by the said spring-pressed arm, a ratchet wheel adapted to be engaged by the said pawl and formed on its base with a worm for actuating a numeral wheel, and springs pressing on the said bell crank lever pawl, to hold the latter normally out of engagement with the said ratchet wheel, substantially as shown and described.

JAMES E. BEAN.

Witnesses:
JOSEPH P. JAMES,
CLARENCE M. BEAN.